No. 718,515. PATENTED JAN. 13, 1903.
W. PEARCY.
COFFEE MILL.
APPLICATION FILED MAY 29, 1902.
NO MODEL.

WITNESSES: W. L. Bushong, Nellie Allemong

INVENTOR Walter Pearcy
BY V. H. Lockwood
ATTORNEY

UNITED STATES PATENT OFFICE.

WALTER PEARCY, OF FRANKLIN, INDIANA.

COFFEE-MILL.

SPECIFICATION forming part of Letters Patent No. 718,515, dated January 13, 1903.

Application filed May 29, 1902. Serial No. 109,465. (No model.)

*To all whom it may concern:*

Be it known that I, WALTER PEARCY, of Franklin, county of Johnson, and State of Indiana, have invented a certain new and useful Coffee-Mill; and I do hereby declare that the following is a full, clear, and exact description thereof, reference being had to the accompanying drawings, in which like numerals refer to like parts.

The object of my invention is to provide a simple, cheap, and effective coffee-grinding mill.

The nature of said invention will be understood from the accompanying drawings and the following description and claims.

Figure 1:
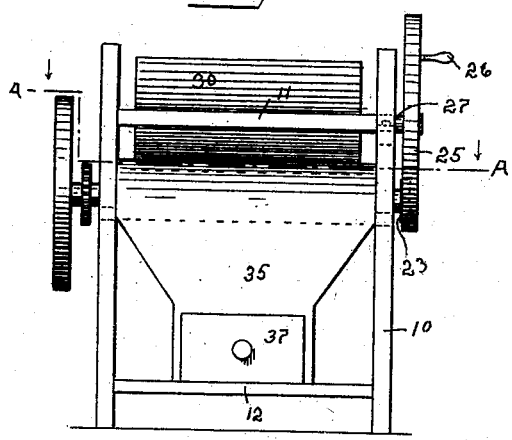
Figure 2:
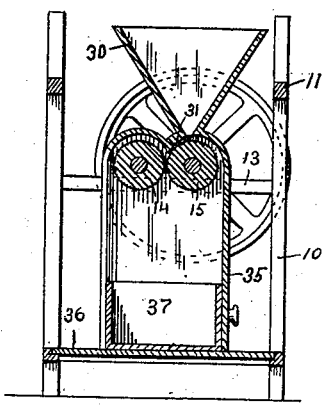
Figure 3:
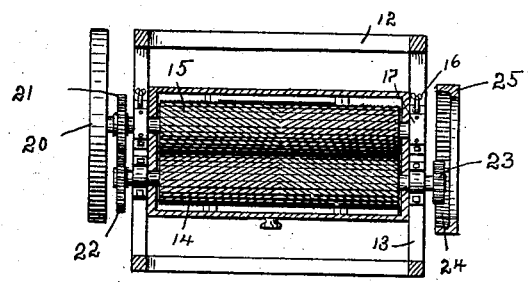
Figure 4:
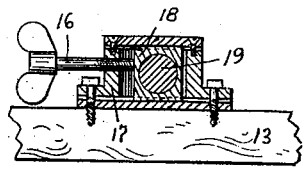

In the drawings, Figure 1 is a front elevation of the mill. Fig. 2 is a central vertical cross-section thereof. Fig. 3 is a horizontal section on line A A of Fig. 1. Fig. 4 is a detail of the means for adjusting one of the rolls.

A suitable rectangular frame is formed of the vertical posts 10, besides the upper bars 11 and lower bars 12 and the end cross-bars 13. A pair of horizontal rolls 14 and 15 are mounted on the end cross-bars 13. The mounting of the roll 14 is stationary, while the roll 15 is adjustable to and from said roll 14 by the set-screws 16, that extend through bearing-box 17 and act against the bearing-block 18, in which the spindle 19 of the roll 15 is mounted.

The adjustable roll 15 carries the fly-wheel 20 at one end and also the gear-wheel 21, the latter meshing with the gear-wheel 22 on the spindle of the roll 14. At the other end said roll 14 has a pinion 23 on its spindle that meshes with the internal gear 24 on the drive-wheel 25, that carries a handle 26, said drive-wheel being independently mounted by the spindle 27 in the main frame.

The rolls are corrugated slightly, and the coffee is deposited within the hopper 30, which discharges upon only one of the rolls—the adjustable roll 15. A corrugated grating-plate 31 is mounted to one side from the outlet to the hopper and next to the other roll 14. This grating-plate 31 is curved eccentric with the roll 15, and its function is to crack the grains into small particles as the coffee that is discharged on the roll 15 moves toward the other roll. The particles thus formed from the breaking up of the coffee-grains will pass between the two rolls and is ground finely and completely comminuted by said rolls.

The coffee is ground fine or coarse by adjusting the roll 15 through the set-screws 16 toward or away from the roll 14, and this same adjustment also adjusts the roll 15 proportionately toward and away from the grating-plate 31. Therefore with only two rolls I am enabled to act twice upon the grains of coffee, and with only one means of adjustment I adjust not only the means for comminuting the coffee, but also the means for breaking up the whole grains into smaller pieces. A suitable casing 35 is provided, surrounding the rolls and extending below the same and resting upon the platform 36. The ground coffee drops into the removable box 37.

What I claim as my invention, and desire to secure by Letters Patent, is—

1. In a coffee-mill, a pair of coöperating horizontally-disposed rolls for comminuting the coffee, one of said rolls being mounted stationary and the other movable toward and from the stationary roll, a hopper with its discharge-outlet over the movable roll, a grating or breaking plate between the outlet of the hopper and the other roll which coöperates with the roll upon which the coffee is discharged from the hopper to break the coffee into smaller grains, and means for adjusting said movable roll with relation to the other roll and the grating or breaking plate.

2. In a coffee-mill, a pair of coöperating horizontally-disposed rolls for comminuting the coffee, a hopper with its discharge-outlet over one of said rolls, a grating or breaking plate between the outlet of the hopper and the other roll which coöperates with the roll upon which the coffee is discharged from the hopper to break the coffee into smaller grains, and means for adjusting the roll upon which the coffee is discharged from the hopper toward and from the other roll and said grating-plate.

In witness whereof I have hereunto affixed my signature in the presence of the witnesses herein named.

WALTER PEARCY.

Witnesses:
V. H. LOCKWOOD,
NELLIE ALLEMONY.